Dec. 4, 1923.
G. A. SAGER
1,476,422
THERMALLY CONTROLLED VALVE FOR LOW WATER SAFETY TELLTALES
Filed June 8, 1921   2 Sheets-Sheet 2
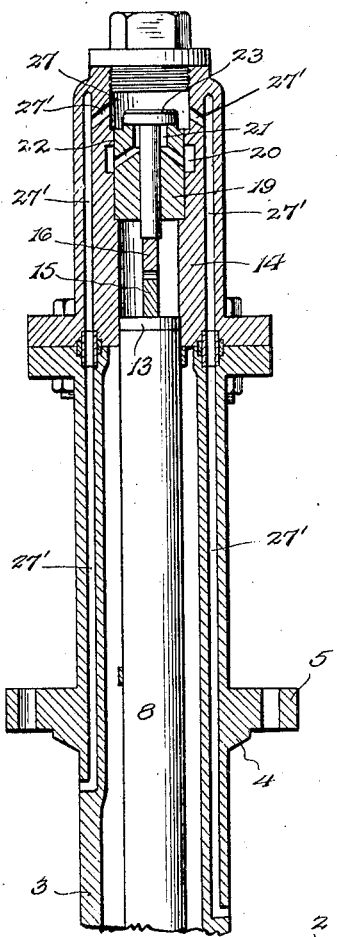
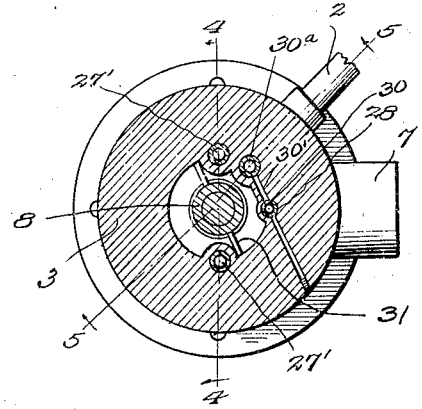
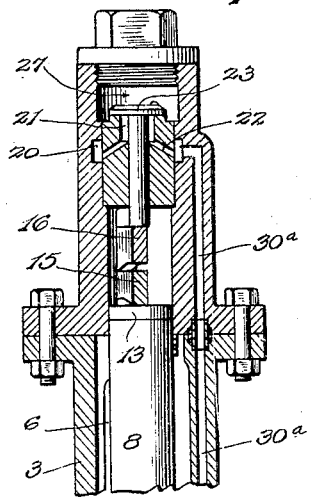
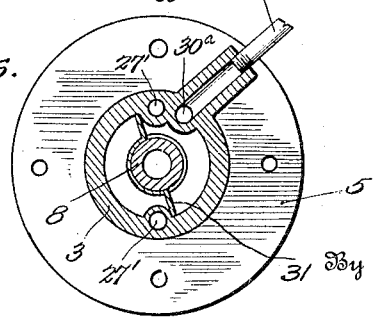
Inventor
G. A. Sager.
By Lacey & Lacey, Attorneys Patented Dec. 4, 1923.

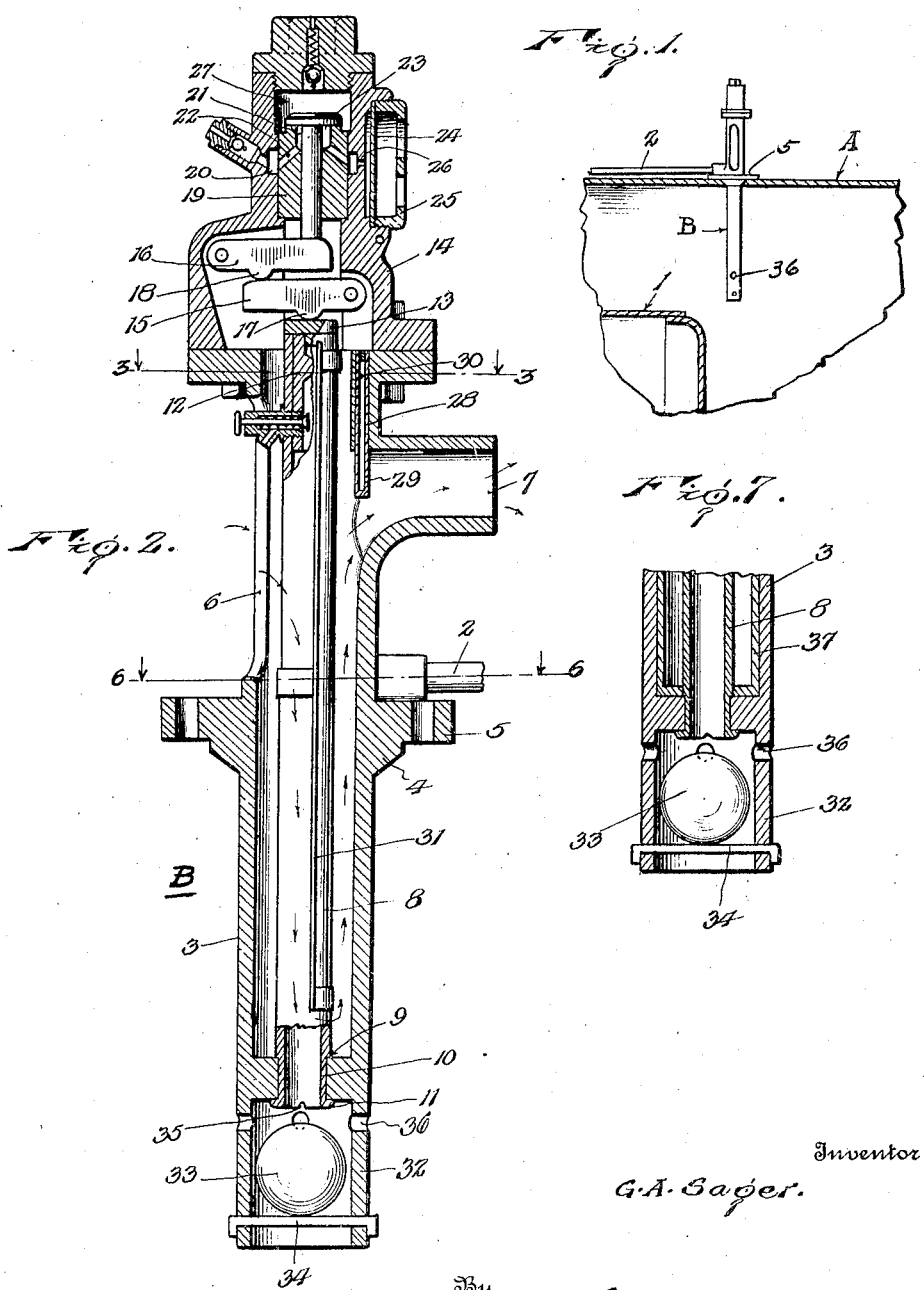

1,476,422

UNITED STATES PATENT OFFICE.

GEORGE A. SAGER, OF ALBANY, NEW YORK.

THERMALLY-CONTROLLED VALVE FOR LOW-WATER SAFETY TELLTALES.

Original application filed March 4, 1920, Serial No. 363,206. Divided and this application filed June 8, 1921. Serial No. 475,970.

*To all whom it may concern:*

Be it known that I, GEORGE A. SAGER, citizen of the United States, residing at Albany, in the county of Albany and State of New York, have invented certain new and useful Improvements in Thermally-Controlled Valves for Low-Water Safety Telltales, of which the following is a specification.

This invention relates to an improved thermally controlled valve for low water safety tell-tales, being a division of my pending application for low water safety tell-tales, filed March 4, 1920, Serial No. 363,206.

Among other objects, the invention seeks to provide a valve which may be employed in extremely short ranges and wherein the expansion tube of the device will normally be partially closed to thereby prevent circulation of hot water in said tube so as to result in a greater range of expansion of the tube when subjected to increased heat.

Other and incidental objects will appear hereinafter.

In the drawing:

Figure 1 is a fragmentary section of a locomotive boiler, partly broken away to show the mounting of the present invention upon the boiler;

Figure 2 is an enlarged vertical sectional view taken medially through the valve;

Fig. 3 is a transverse sectional view on the line 3—3 of Fig. 2, looking in the direction indicated by the arrows;

Fig. 4 is a fragmentary vertical sectional view on the line 4—4 of Fig. 3, looking in the direction indicated by the arrows;

Fig. 5 is a fragmentary vertical sectional view on the line 5—5 of Fig. 3, looking in the direction indicated by the arrows;

Fig. 6 is a transverse section on the line 6—6 of Fig. 1, looking in the direction indicated by the arrows; and Figure 7 is a fragmentary section showing a slight modification, the casing of the device being provided with a lining.

Referring now more particularly to the drawing, I have, for convenience, illustrated the present invention in connection with a locomotive boiler A having a portion of the shell thereof broken away to show the crown sheet 1. Near this end of the sheet is disposed the present valve, indicated as a whole by the reference letter B, this valve controlling a steam line including a pipe 2 leading to an audible signal as shown in my pending application previously referred to. However, since this audible signal forms no part of the present invention, it need not be herein described in detail.

The present valve is, for the most part, substantially identical with the valve shown in my pending application. Accordingly, it becomes unnecessary to repeat in detail all of the various features of the valve. Therefore, only such parts of the structure will be described as are believed pertinent to a thorough understanding of the present improvements. A casing 3 is employed, the casing being provided with a seat 4 and flange 5 for attachment to the boiler shell as indicated in Figure 1. The casing is open at one side, as indicated at 6, and provided at its opposite side with an outlet 7. Within the casing and positioned axially with respect thereto is a tubular member 8 having a shoulder 9 which seats in the bottom of the casing 3, said member being also formed with a reduced portion 10 swaged over, as indicated at 11, to fixedly anchor the lower end of the member. The upper end of the member carries a reinforcing bushing 12 which is brazed or otherwise suitably secured in place and supports a hardened steel cap 13. Secured to the upper end of the casing 3 is a head 14 in which are mounted superposed levers 15 and 16 having fulcrums 17 and 18, the fulcrum 17 resting against the cap 13, thus forming a compound lever action which will elevate the free end of the lever 16 as the expansion tube 8 lengthens due to heat. Mounted in the head is a valve seat 19 surrounded by a chamber 20 and provided with a counterbore 21 from which passages 22 lead to said chamber. Closing the counterbore 21 is a valve 23, the stem of which rests against the free end of the lever 16. The head also carries at one side thereof a frangible disc 24 retained in place by a spoke member 25, it being observed that a chamber is formed behind the disc and leading from said chamber to the chamber 20 is a minute steam passage 26.

Above the valve seat 19 is a chamber 27 to which steam is supplied at boiler pressure through passages 27' in the casing 3 and head 14 and inserted in the casing to extend down to approximately the center line of the outlet 7 is a tube 28 having an opening 29. The tube is closed at its upper end by a plug and is provided with an opening 30 in communication with a passage 30' entering a second passage 30ª leading direct through the casing and head to the chamber 20. Thus, when the expansion tube 8 lengthens due to heat, the levers 15 and 16 will be rocked to elevate the valve 23. Accordingly, since steam is supplied at boiler pressure in the chamber 27, the steam will, when the valve is lifted, flow into the chamber 20 and thence through the opening 30 and tube 28 to discharge through the opening 29, the jet of steam being expelled from this opening forming a visible signal indicating operation of the valve 23 and at the same time causing a circulation of air around the tube 8 which has vertical baffle members 31 whereby air drawn in at the open side 6 of the casing 3 passes downwardly as indicated by the arrows, on one side of the tube and upwardly on the other side thereof and out through the passage 7 which thus assists contraction of the expansion tube 8 when the water level within the boiler is finally raised. Connected to the casing 3 to communicate with the passage 30ª is the pipe 2 previously noted. When the valve 23 is opened to admit steam to the chamber 20, steam will, of course, flow through the passage 26 to rupture the disc 24, rupturing of this disc making a permanent record for detecting carelessness or negligence of the engineer.

The present invention consists in providing, in conjunction with the valve as just described, a float for normally obstructing the expansion tube 8. Formed on the casing 3 at its lower end is an extension or chamber 32 in which is freely disposed a spherical float 33 retained by a cross pin 34. The lower end of the expansion tube is notched at one or more places, as indicated at 35 and formed through the extension at several points on a line with the low water level are openings 36. Thus, as long as the water in the boiler remains at or above the level of the openings 36, the water will enter through said openings and at the lower end of the chamber 32 for holding the float against the lower end of the expansion tube partially closing said tube. Natural circulation of the hot water from the boiler into said tube will thus be retarded while the tube will, for such reason, become much cooler than would otherwise be the case. Accordingly, when the water does become low in the boiler and the float drops to permit an increase of heat within the tube, a greater range of expansion of the tube will be had. If desired, an asbestos lining 37 for the casing 3, may, as illustrated in Figure 3, also be employed in this construction.

Having thus described the invention, what is claimed as new is:

1. A thermally operated valve including a casing, a valve mounted therein, a thermally expansible element within the casing for opening the valve, and means for obstructing a circulation of water in said element.

2. A thermally operated valve including a casing, a valve mounted therein, a thermally expansible element within the casing for opening the valve, and a float obstructing a circulation of water in said element.

3. A thermally operated valve including a casing, a valve mounted therein, a thermally expansible element arranged within the casing for opening the valve, said element being open at its lower end, and means for partially closing the lower end of the element to obstruct a circulation of water therein.

4. A thermally operated valve including a casing, a valve mounted therein, a thermally expansible element arranged within the casing for opening the valve, said element being open at its lower end, and a float partially closing the lower end of the element to obstruct a circulation of water therein.

5. A thermally operated valve including a casing, a valve therein, a tubular thermally expansible element within the casing for opening the valve, and buoyant means disposed to overlie one end of said element for obstructing circulation of water therein.

6. A thermally operated valve including a casing, a valve therein, a thermally expansible element within the casing for opening the valve, and a float housed within the casing and movable to overlie one end of said element for obstructing a circulation of water therein.

7. A thermally operated valve including a casing, a valve therein, a thermally expansible element within the casing for opening the valve, the casing being formed with an extension, and a float disposed within said extension and movable to overlie one end of said element for obstructing a circulation of water therein.

8. In a thermally operated valve, a casing closed at one end, a valve within the casing, a thermally expansible element arranged within the casing for opening the valve, said element opening through the closed end of the casing, and means to cooperate with the element for obstructing a circulation of water therein.

9. In a thermally operated valve, a casing having an end wall, a valve within the casing, a hollow thermally expansible element arranged within the casing for opening the valve, said element being anchored at one end to said wall and opening therethrough and means to cooperate with said end of the element for obstructing a circulation of water therethrough.

10. In a thermally operated valve, a casing having an end wall provided with an extension beyond said wall, a valve within the casing, a hollow thermally expansible element arranged within the casing for opening said valve, said element being anchored to said wall and opening therethrough into the extension, and a float within the extension to cooperate with said end of the element for obstructing a circulation of water within the element.

In testimony whereof I affix my signature.

GEORGE A. SAGER. [L. S.]